United States Patent [19]

Kesting

[11] 3,884,801

[45] May 20, 1975

[54] PREPARATION OF REVERSE OSMOSIS MEMBRANES BY COMPLETE EVAPORATION OF THE SOLVENT SYSTEM

[75] Inventor: Robert Emil Kesting, Mount Baldy, Calif.

[73] Assignee: The United States of America as represented by the Secretary of the Interior, Washington, D.C.

[22] Filed: Sept. 26, 1973

[21] Appl. No.: 401,003

Related U.S. Application Data

[63] Continuation-in-part of Ser. No. 249,571, May 2, 1972, abandoned.

[52] U.S. Cl.................. 210/23; 210/500 M; 264/41
[51] Int. Cl............................................. B01d 13/00
[58] Field of Search ........... 210/500, 490, 507, 321, 210/23; 55/16, 158; 23/258.5; 264/41, 49; 204/296

[56] References Cited
UNITED STATES PATENTS

| | | | |
|---|---|---|---|
| 3,129,159 | 4/1964 | Maier et al. ........................ | 204/180 |
| 3,524,753 | 8/1970 | Sharp................................ | 264/49 X |
| 3,666,508 | 5/1972 | Justice et al...................... | 210/500 X |

FOREIGN PATENTS OR APPLICATIONS

| | | | |
|---|---|---|---|
| 920,815 | 3/1963 | United Kingdom................. | 210/500 |

*Primary Examiner*—Frank A. Spear, Jr.
*Attorney, Agent, or Firm*—William S. Brown; Gersten Sadowsky

[57] ABSTRACT

A method for preparing asymmetric reverse osmosis membranes by preparing a dilute solution of cellulose acetate in a solvent system consisting of a solvent and at least one pore-forming material selected from the nonsolvents for cellulose acetate, casting the solution to form a thin film, and allowing the solvent system to evaporate completely. The dry membranes so formed can be stored in the absence of water and rewet when necessary for use in reverse osmosis separations. The membranes can be repeatedly dried and rewet without any special treatment steps and without harm to the membrane.

8 Claims, No Drawings

PREPARATION OF REVERSE OSMOSIS MEMBRANES BY COMPLETE EVAPORATION OF THE SOLVENT SYSTEM

BACKGROUND

The application is a continuation-in-part of my co-pending application Ser. No. 249,571, filed May 2, 1972, now abandoned.

Osmosis is a naturally occurring phenomenon in which a semipermeable membrane separating solutions of different concentrations permits the passage of solvent from the dilute to the concentrated solution but restrains the flow of solute. The flow of pure solvent can be stopped, however, if it is opposed by a force equal to the osmotic pressure. This pressure has a characteristic value depending on the particular solute and solvent, and the concentration of each but independent of the nature of the semipermeable membrane. By applying a pressure greater than osmotic to the more concentrated solution, the flow of pure solvent can actually be reversed. Thus, if saline water at a pressure above osmotic is contacted with an appropriate semipermeable membrane, pure water may be recovered from the opposite side. This process, aptly named reverse osmosis, is particularly useful in separating solvents from solutions and has evoked considerable interest as an economical process for the desalination and purification of water.

The properties of the membrane are a major determinant in the cost of desalination by reverse osmosis. First, the membrane must demonstrate adequate selectivity, the ability to discriminate against solute while allowing solvent to pass through. Usually this property is expressed in terms of the percentage salt rejection defined as 100 times the difference between the concentration of solute in the feed and that in the permeate, divided by the concentration in the feed. Although the required selectivity depends on the concentration of the feed stream and the desired purity of the product, in general, to provide an economical process meeting commonly accepted potable water purity requirements (500 ppm or less dissolved solids) a semipermeable membrane should have a selectivity of about 90 to 95 percent for brackish water (usually about 3000-5000 ppm dissolved solids) and 99 or more for the purification of sea water (35,000 ppm dissolved solids). Secondly, it is important that the flow of water through the membrane be more than a mere trickle. The rate of flow of water through a unit area of membrane is known as the flux and the higher its value the more economical is the separation process.

One of the most successful reverse osmosis desalination membranes has been prepared by a technique developed in the early 1960's by Loeb and Sourirajan. In this method, a relatively concentrated solution of cellulose acetate is prepared in a mixture consisting of a solvent and appropriate swelling agents and/or nonsolvents. This solution is cast at a temperature of about 0° to 23°C to form a thin film which is then exposed to the air for approximately 3 to 5 minutes. During this period, solvent evaporates rather rapidly from the air exposed surface of the membrane as opposed to the slow removal of solvent from underlying portions bounded by the casting surface. Subsequently, the membrane is submersed in ice water for about 1 hour to complete the gelation of the membrane and a thin skin forms on the air exposed side of the membrane. Finally, the membrane is treated with hot water to tighten this skin. This process is described in U.S. Pats. Nos. 3,133,132, 3,133,137, and 3,170,867.

The membranes formed by this process are known as asymmetric membranes because they consist of two distinct layers and because the properties of the membrane depend on which side of the membrane faces the feed solution. The brief evaporation period followed by immersion in water apparently causes a thin skin to form on the air-exposed side of the membrane, the skin being responsible for the membrane's salt rejection. The remainder of the membrane consisting of a very porous substructure offers support for the thin skin and generally allows water to pass through it, but does not exclude salt. The membrane is much more effective if the skin side faces the feed solution.

Although the asymmetric membranes prepared by the method developed by Loeb and Sourirajan are the best mambranes fabricated to date, they still suffer from a number of disadvantages. Despite the excellent salt rejection and water flux the membranes initially possess, they tend to demonstrate a rapid decline in the flux, probably caused by the compaction of the porous substructure under the high pressures used in reverse osmosis. In addition, the numerous steps used in preparation has made reproduction of the membranes difficult, and the preparation of large quantities of the membranes is a rather tedious matter.

Finally, asymmetric membranes prepared by this method are water equilibrated, i.e., they must constantly be maintained in water. If the membranes are allowed to dry, their structure is destroyed and they cannot be restored to a condition suitable for use in reverse osmosis separations. This presents numerous problems in storing, handling, and installing the membranes and difficulties in shutting down a reverse osmosis desalination system without ruining the membranes. A further complication arises because these membranes are subject to biological attack by organisms in the water in which the membranes are stored. Techniques for drying the membranes are available, for example, those shown in U.S. Pats. Nos. 3,592,672 and 3,428,584. However, these multistep processes only add to the multiplicity of preparatory steps already used. The dried membranes can be rewet for use, but each time they are to be dried, the same series of steps must be followed.

In view of these problems it is an object of my invention to prepare asymmetric reverse osmosis membranes which have excellent reverse osmosis properties, are dry when prepared, and can be rewet and redried numerous times without detriment to the membranes and without any special treatments.

It is a further object of my invention to prepare membranes with these characteristics by a process comprising only two steps.

THE INVENTION

I have now discovered that an asymmetric reverse osmosis membrane can be prepared by forming a dilute solution of cellulose acetate in a solvent system consisting of a volatile true solvent for the polymer and at least one nonsolvent which acts as a poreforming material. The solution is cast into a thin film and allowed to dry completely. The membranes formed by this process are wet-dry reversible, i.e., they can be wet and dried numerous times without any special treatments and without any impairment of the membrane properties.

THEORY

THE MEMBRANES

Asymmetric cellulose acetate membranes produced either by the prior art process or by the method of the present invention consist of two separate layers: a thin dense skin layer which is the effective resistance to solute transport and a thick porous substratum which acts as a mechanical support for the skin but exhibits little or no resistancee to the transport of either solute or solvent. The porous support layer consists of an open cell structure which freely permits permeation through the channel in the cells.

While the exact nature of the skin is still a matter of debate, recent evidence from electron microscopial studies suggest that this layer is composed almost exclusively of sperical nodules approximately 200 A in diameter which are believed to be crystalline in nature. Speculations about the method of solvent separation at the dense skin have largely discounted the possibility that permeation occurs through these microcrystallites. Presently, it is postulated that water transport takes place through the tight channels (20 to 30 A in diameter) between the closely packed microcrystallites. The water within these channels is very ordered, i.e., it is less mobile and has a much lower dielectric constant than ordinary ion-solvating water. Since sodium chloride is insoluble in ordered water, it is excluded from these channels and cannot permeate the skin. However, because the hydrogen-bonding capacity of ordered water is not diminished to the same extent as its ion-solvating capacity, water and other hydrogen-bonding species can permeate.

It is critical then that the channels between the microcrystallites be of the appropriate size. If the microcrystallites are too far apart and the channels are wide, ordinary ion-solvating water will be contained in the channels. Salt can dissolve in this water and permeate the membrane. This problem can be rectified by annealing the membranes to contract the skin, bringing the microcrystallites closer together to exclude ion-solvating water from the channels.

THE CASTING SOLUTION

Preparation of an asymmetric reverse osmosis membrane begins with the formulation of a casting solution which generally consists of cellulose acetate, a solvent, and at least one swelling agent and/or nonsolvent. Each of these constituents has a function in the preparation of the membrane and the properties of the individual constituent will affect the structure and properties of the product.

Among the important properties of the cellulose acetate polymer are the purity of the cellulose, acetyl content, and molecular weight and molecular weight distribution. The goal in selecting the particular cellulose acetate polymer is to provide a membrane skin which has channels with uniformly small diameters. Large variations in channel size will present a greater opportunity for salt to pass through the membrane. Thus, high purity cellulose such as that derived from cotton is desired, because the presence of other polysaccharides such as the xylans of mannans found in wood-derived cellulose will probably cause variations in microcrystallite size and structure, and, therefore, variations in channel size. Similarly, higher concentrations of acetyl groups are generally desired because they promote crystalline perfection and uniformity. In addition, there is evidence that such groups promote order in water and provide an additional benefit by their use. Since a high degree of mobility in the casting solution, i.e., low viscosity, favors crystalline perfection, polymer concentration and molecular weight also influence salt rejection. A narrow molecular weight range of the cellulose acetate polymer also increases salt rejection.

Varying the polymer properties, however, may be rather difficult, particularly if a commercially available cellulose acetate polymer is utilized, since polymer properties are to a large extent fixed for a given grade. Blending of various grades may be successful in varying the properties over a limited range.

Although a certain amount of control over membrane properties may be achieved by the choice of the cellulose acetate polymer, far greater variation may be achieved by designing a suitable solvent for the cellulose acetate and at least one agent selected from the group of swelling agents and nonsolvents. It is important that the true solvent have excess solvation capacity so that it can accommodate not only the cellulose acetate itself, but also the other components of the solvent system. It has also been observed that the porosity of the substratum varies directly and the thickness of the skin inversely with the concentration of the swelling agent and/or nonsolvent in the casting solution. This is significant because the water flux through the membrane increases with increasing porosity and decreasing skin thickness. The swelling agents and/or nonsolvents employed in these solutions are chosen to fulfill their primary purpose of producing pores in the membrane substratum.

FORMATION OF THE MEMBRANE--GENERAL OBSERVATIONS

To understand the manner in which the specific membrane preparatory processes work, it is helpful to first consider a general case. Initially, a casting solution consisting of cellulose acetate, solvent, swelling agent(s) and/or nonsolvent(s) as previously described, is cast as an optically clear homogeneous film on a casting surface such as a glass plate. Immediately the solvent begins to evaporate and after a sufficient amount of solvent has been lost, the solution becomes turbid indicating that there has been a change in the colloidal structure of the film. This change is known as phase inversion. Shortly thereafter, the membrane gels to assume its primary gel configuration. Subsequently this membrane can be modified by heat or pressure to form a more dense secondary gel structure. The membrane formed is asymmetric.

A closer look at what happens on the colloidal level is necessary to explain the formation of the distinct membrane layers. As soon as the solution is cast, solvent begins to evaporate. Since the solvent leaves through the solution-air interface much more rapidly than it does from the body of the film, the polymer solution soon becomes more concentrated at the air surface than throughout the rest of the film. To some extent this increase in concentration of cellulose acetate at the solution-air interface is also caused by the surface activity of the cellulose acetate polymer. In any event, the polymer soon comes out of solution to form the skin layer, and as drying continues, the microcrystallites in this layer form and move closer together.

The substructure of the membrane develops in a different way. Once the skin is formed, evaporation and hence desolvation are reduced considerably so that gelation of the substructure takes place much more slowly than that of the skin. Eventually, however, remaining solvent power becomes insufficient to maintain all the components in a homogeneous solution. Since the solvent is more volatile than the swelling agent, a considerable amount of the latter remains even after much of the solvent has been lost. The swelling agent then separates from the continuous phase as tiny dispersed droplets. The polymer molecules aggregate about these droplets because of surface activity and because insufficient solvent is available to keep them in the continuous phase. As more solvent is lost, the polymer-coated droplets of swelling agent approach one another more closely and deform into polyhedra. When both solvent and swelling agent are removed, the polymer coating of the droplets is stretched too thin and ruptures, leaving behind an open-celled structure which accounts for the substratum's low resistance to permeation by either solvent or solute.

FORMATION OF MEMBRANES BY PRIOR ART PROCESSES

Having reviewed what generally occurs during the formation of asymmetric cellulose acetate membranes, it is now easier to understand what happens in the preparatory processes actually used. In the process of Loeb and Sourirajan's ("wet process") a solution containing about 20 percent cellulose acetate is prepared with acetone as the solvent and either formamide, a swelling agent, or a mixture of water, a nonsolvent, and magnesium perchlorate, a swelling agent, as the remaining constituents. After the solution is cast at about −11°C, the resulting film is allowed to dry for approximately 1 to 3 minutes. This partially dried film is then immersed in water at 0°C and washed for 1 hour to remove the components of the solvent system from the film and to form the primary gel membrane. The membrane is annealed at 70° to 90°C to produce a secondary gel membrane suitable for use in desalination.

Both because the casting solution is relatively concentrated and because swelling agents in which the polymer is soluble are employed, the time allowed for drying the wet nascent membrane must be controlled. If the membrane is allowed to dry for more than three minutes, the film will lose its porosity. Unfortunately, the rather premature quenching in cold water has detrimental effects on the membrane skin. As mentioned previously, after the skin has formed, it consists of microcrystallites which move closer together as solvent continues to evaporate. Early quenching freezes these microcrystallites and prevents the skin from achieving it maximum density. Since the channel diameter between the microcrystallites is large enough to accommodate some ordinary ion-solvating water, the salt rejection is very poor or altogether absent. The only alternative, therefore, is to add an annealing step after quenching to drive the microcrystallites closer together. Annealing to progressively higher temperatures permits the membranes to become progressively denser, decreasing the channel diameter and increasing the salt rejection.

The product membranes exhibit a bluish opalescence because the substructural voids are about the same size or smaller than the wavelength of blue light (0.4 $\mu$m). Electron microscopy indicates that the diameters of the substructural voids in these wet membranes are about 0.1 to 0.5 $\mu$m. The principal reason for the small substructural voids is the high concentration of polymer in the casting solution: the higher the concentration, the smaller the voids.

These membranes must be kept wet or the substantial capillary forces will bring the opposing sides of the cell walls in contact with one another with the result that they collapse. This leads to a loss of porosity in the substructure and a decrease in the water flux. Although these membranes may be dried by complicated treatments, no membrane prepared by this process is wet-dry reversible in the true sense of the expression, i.e., can be changed from one form to the other without damage merely be wetting or drying.

FORMATION OF MEMBRANES BY THE DRY PROCESS

In contrast to this intricate wet process which requires rather careful control of several separate fabrication steps, the "dry process" which I have invented consists of two simple steps. The solution is cast, usually at ambient temperatures, and the resulting film is then allowed to dry completely, hence the name dry process.

An important feature of the dry process is the casting solution which is more dilute than those previously employed in the prior art. In addition, excellent membranes are prepared if the solvent and nonsolvents contained in the casting solution meet certain general conditions discussed later in this specification.

As with the processes used in the prior art, the skin forms after casting and prior to the gelation of the substructure. The nascent skin exhibits spherical microcrystallites which appear identical to those found in the wet membranes. Because a dilute solution is used and because pore-forming materials which are nonsolvents are employed, there is no problem with densification of the substructure which in the prior art necessitated a limited drying step. After the solvent system has evaporated, the dry reverse osmosis membrane does not require annealing because the absence of an intervening quenching step allows the microcrystallites to approach one another as closely as possible and the skin can achieve its maximum density.

In contrast to the opalescence of the wet process membranes, dry reverse osmosis membranes are opaque. This is caused by the larger void size (1–2 $\mu$m) in the substratum of the dry membranes. Because of this large void size in the dry reverse osmosis membrane, capillary forces are not sufficient to cause void collapse; densification and loss of porosity do not occur as a result of drying. It also allows these membranes to be truly wet-dry reversible. Membranes can be made, fabricated into modules, and stored indefinitely without any fear of microbiological degradation. Once used, modules containing dry reverse osmosis membranes can be dried again, stored indefinitely, and reused without suffering a substantial loss in either product flux or salt rejection. Furthermore, dry membranes can be transported to cold climates without any protection against freezing.

DESCRIPTION

The preparation of dry reverse osmosis membranes is accomplished very simply by preparing a dilute solution of cellulose acetate, casting this solution to form a thin film and allowing the volatile agents in the casting solution to evaporate completely.

The casting solutions employed consist of cellulose acetate, a solvent, and a pore-forming material which is a nonsolvent for the cellulose acetate. Among the grades of cellulose acetate which have been used in practicing this invention are E-394-60, E-398-10, and E-400-25 available from Eastman Chemical Co., Kingsport, Tenn., and having acetyl contents of 39.4, 39.8, and 40.0 percent respectively. A grade of cellulose acetate, A-432-130B, available from the same manufacturer and having an acetyl content of 43.2 percent may also be used in conjunction with E-394-60, E-394-30 or E-394-45. In general, while this specification is directed toward the use of cellulose acetate, it should be understood that this term includes cellulose acetate, cellulose diacetate, cellulose triacetate, and blends thereof. Other cellulose esters may also be used including the cyanoethylate, butyrate, propionate, and methacrylate forms. Blends of these various cellulose esters may be used as well as cellulose mixed esters such as cellulose acetate methacrylate. The dry process may also be used to prepare membranes of cellulose ethers.

Solvents useful in my invention include any complete solvent for the particular cellulose ester or ether used. Among these solvents particularly useful in preparing dry membranes of cellulose acetate are methylene chloride, acetone, and dioxane.

In addition, the solution should contain at least one material which aids in the formation of pores in the substratum of the asymmetric membranes. Some confusion in semantics is involved in denominating such materials as either swelling agents, weak swelling agents, or nonsolvents. Part of this uncertainty stems from the fact that the properties of a given material which would put it into a particular classification depend on the concentration and temperature at which this material is employed. Thus, there may be some confusion as to whether a particular material to be used in my invention can be termed a weak swelling agent or a nonsolvent. Although some of the materials suitable as pore-producing agents in my invention might be classified as weak swelling agents, unlike the pore-forming materials used in the prior art processes, all pore-forming constituents used in my invention have a very low affinity for the polymer, i.e., they are all essentially nonsolvents for the polymer. Because of this common property, this term is used to describe them, although it may not be the only one which might accurately be applied. In addition, pore-forming materials should not react with the polymer or solvent, should be volatile, and should hve a boiling point at least about 30° to 40°C higher than that of the solvent. Suitable nonsolvents include isopropanol, t-butyl alcohol, methanol, ethanol, and water. Isomeric butanols and pentanols, in general, meet these requirements.

Excellent membranes are prepared when the solvent and pore-forming material employed in the casting solution meet three general conditions. First, the constituents should evaporate in the sequence of solvent first followed by the nonsolvent. Thus, the solvent should be more volatile than the pore-forming material. For example, if dioxane (boiling point 101°C) is employed as a solvent, then a less volatile compound must be utilized as the nonsolvent. If isopropanol (b.p. 82°C) is used as the pore-forming material, much dioxane will remain behind by the time most of the isopropanol has evaporated. As a consequence, the remaining casting solution consisting of only solvent and polymer will dry and become a dense film rather than an asymmetric membrane.

Secondly, the desolvation of solvent and nonsolvent should be sequential rather than concurrent. If, for example, the nonsolvent is almost as volatile as the solvent, then both species will leave more or less simultaneously and a dense almost impermeable membrane will be formed. To prevent this, there should be a considerable difference in the volatilities of the solvent and nonsolvent thereby insuring sequential removal. This can be achieved by using reagents which have boiling point differences of approximately 30° to 40°C.

Finally, the functions of the elements in the solvent system should not overlap. Specifically, if the concentration of any pore-forming constituent in the solution is greater than or equal to five percent, such component must not function as a solvent, either weak or strong for the polymer. This is an important requirement since a pore-forming constituent with too strong an affinity for the polymer will cause the membrane to be dense. Thus, formamide is not a good dry process pore-forming material, since formamide itself is a solvent for cellulose acetate. If a dilute solution of cellulose acetate, acetone, and formamide is allowed to dry completely, a dense film will result.

As mentioned previously, a distinguishing feature of this invention is that the casting solutions utilized are more dilute than those generally used in the prior art. When concentrated solutions are used, complete evaporation of the solvent cannot be permitted as it would lead to densified membranes, particularly when such solutions contain swelling agents with a strong affinity for the cellulose acetate polymer, such as aqueous magnesium perchlorate or formamide. The solutions used in my invention, therefore, contain at most 15 weight percent cellulose acetate. Similarly, for each particular cellulose ester and grade of that ester there appears to be a lower limit to the concentration of the polymer in the casting solution. Below this limit it is difficult if not impossible to form integral asymmetric membranes, i.e., membranes which are continuous and homogeneous with respect to both skin and substructure. Thus, for each cellulose acetate, and cellulose acetate grade and more generically, for each cellulose ester, there is a particular range of concentrations in the casting solution for which integral asymmetric membranes can be prepared by the dry process.

The concentration of the pore-forming material in the casting solution is also limited. Experimennts to date show that the thickness of the asymmetric skin vaires inversely with the concentration of the pore-forming material, thereby setting an upper limit above which an effective skin layer will not be formed. On the other hand, the porosity of the substructure and, thus, to a large extent the flux of the membrane increases with concentration of the pore-forming material. As a result, the concentration of the pore-forming material in the casting solution must be chosen so that the membrane substructure has sufficient porosity and the membrane skin is sufficiently thick and uniform for adequate selectivity.

The process of forming the membrane is extremely simple and consists of casting the membrane into a thin film and allowing complete evaporation of the solvent and nonsolvents. Since both the solvent and nonsolvent are volatile, they are quantitatively recoverable by standard procedures employed in the solvent cast film industry.

Any of the techniques known in the art may be used to cast the individual membrane or membranes in continuous form. It is also apparent that the process of forming dry membranes is not limited to the preparation of membranes of a particular design. Membranes can be prepared for use in reverse osmosis devices of almost any configuration including the plate, tubular, or spiral wound types commonly known in the art. Similarly dry asymmetric membranes can be cast directly on additional support layers or can be prepared and later affixed to such support layers if they are needed. Annealinng of the finished product is not required, since the microcrystallites in the skin have already moved tightly together to form a highly selective barrier.

Finally, although my invention has been described with particular regard to the desalination of water, the improved membranes prepared by the process of my invention may also be used for the separation of water from electrolyte solutions such as sea water, brackish water, acid mine water, and industrial brines and bitterns; the separation of organic liquids; the purification and concentration of liquid feeds such as citrus juices, beer, and syrups; the purification of liquid wastes such as urine; and the separation of gaseous mixtures.

EXAMPLE 1.

A casting solution was prepared using the following formulation:

| | |
|---|---|
| Cellulose Acetate Eastman E-394-60 | 5 grams |
| Cellulose Acetate Eastman E-432-130B | 1 gram |
| methylene chloride | 69 grams |
| ethanol | 20 grams |
| t-butyl alcohol | 13 grams |
| water | 2.5 grams |

The solution was cast onto a glass surface at room temperature and allowed to dry until the membrane appeared opaque. The membrane was then placed in a test cell with the skin side facing the (about 0.4 percent) aqueous sodium chloride feed solution. Test conditions were 800 psi and approximately 25°C. After each test cycle the membranes were dried completely at 25°C overnight and rewet before testing. This cycle was repeated 7 times. The results are shown in Table I.

Table I

| Cycle (dry-rewet) | Flux (gfd) | Salt Rejection (%) |
|---|---|---|
| 1 | 13.3 | 94.2 |
| 2 | 12.17 | 94.0 |
| 3 | 11.2 | 92.0 |
| 4 | 13.3 | 90.0 |
| 5 | 12.17 | 89.0 |
| 6 | 9.3 | 91.5 |
| 7 | 10.6 | 85.5 |

EXAMPLE 2

Casting solutions were prepared varying the pore-forming materials and the quantity of these materials included in the solution. The following solutions produced dry membranes by the simple process described in the previous example:

| | Solution A | |
|---|---|---|
| Cellulose Acetate | Eastman E-394-60 | 5 grams |
| Cellulose Acetate | Eastman E-432-130B | 1 gram |
| methylene chloride | | 69 grams |
| ethanol | | 20 grams |
| t-butyl alcohol | | 13 grams |
| water | | 2.5 grams |
| | Solution B | |
| Cellulose Acetate | Eastman E-394-60 | 12 grams |
| Acetone | | 65 grams |
| t-butyl alcohol | | 65 grams |
| water | | 1 gram |
| | Solution C | |
| Cellulose Acetate | Eastman E-400-25 | 15 grams |
| Acetone | | 65 grams |
| t-butyl alcohol | | 65 grams |
| | Solution D | |
| Cellulose Acetate | Eastman E-394-60 | 9 grams |
| Dioxane | | 67 grams |
| 1-butanol | | 35 grams |

The membranes were tested in the same manner and conditions as in Example 1 and the results are given below in Table II.

Table II

| Solution | Salt Rejection % | Flux [gallons/ sq.ft./day] |
|---|---|---|
| A | 94.2 | 13.3 |
| B | 93 | 2.5 |
| C | 96 | 2.2 |
| D | 86 | 1.0 |

The data of Table II confirms the earlier noted requirement that a difference of about 30° to 40°C in the boiling points of the solvent and nonsolvent is desirable. When the desolvation of solvent and nonsolvent is concurrent rather than sequential, the quality of the membrane is reduced. Solutions B, C, and D of Example 2 were prepared from reagents having a boiling point difference of less than 30°C. A marked decrease in flux is found in the membranes produced from these solutions from those of the invention as illustrated by Solution A. Where the nonsolvent possesses a volatility close to the solvent, then both species will evaporate from the membrane surface almost simultaneously, resulting in the formation of a dense almost impermeable membrane of low flux.

My invention as described herein may be embodied in other specific forms without departing from the spirit or essential characteristics thereof. The present embodiments are therefore to be considered in all respects as illustrative and not restrictive.

I claim:

1. A process for forming an asymmetric reverse osmosis membrane consisting essentially of the steps:

a. preparing a dilute solution consisting of a cellulose ester in an amount less than or equal to 15 percent by weight of the solution, a solvent for the cellulose ester consisting of acetone or dioxane, and at least one pore-forming material, the solvent having a boiling point at least 30°C lower than the boiling point of the pore-forming material and the pore-forming material being a nonsolvent for the cellulose ester, b. casting said dilute solution to form a thin film, and c. allowing the solvent and pore-forming material to evaporate completely.

2. The process of claim 1 wherein said cellulose ester is selected from the group consisting of cellulose acetate, cellulose diacetate, cellulose triacetate, cellulose propionate, cellulose butyrate, cellulose cyanoethylate, cellulose methacrylate, blends of at least two of said cellulose esters, and cellulose mixed esters having at least two of the acid moieties of said esters.

3. The process of claim 2 wherein the pore-forming material is selected from the group consisting of isopropanol, ethanol, methanol, water, and isomeric butanols and pentanols.

4. The process of claim 1 wherein the cellulose ester is cellulose acetate.

5. The process of claim 1 wherein the pore-forming material is selected from the group consisting of isopropanol, ethanol, methanol, water, and isomeric butanols and pentanols.

6. An asymmetric reverse osmosis membrane prepared by the process consisting essentially of the steps:

a. preparing a dilute solution consisting of a cellulose ester in an amount less than or equal to 15 percent by weight of the solution, a solvent for the cellulose ester consisting of acetone or dioxane, and at least one pore-forming material, the solvent having a boiling point at least 30°C lower than the boiling point of the pore-forming material and the pore-forming material being a nonsolvent for the cellulose ester, b. casting said dilute solution to form a thin film, and c. allowing the solvent and pore-forming material to evaporate completely.

7. In a reverse osmosis process for separating solute from solvent employing a semipermeable membrane, the improvement which comprises employing as the semipermeable membrane the membrane of claim 6.

8. The method of claim 7, wherein the solute is one or more salt compounds and the solvent is water.

* * * * *